US010556465B2

(12) United States Patent
Turozi et al.

(10) Patent No.: US 10,556,465 B2
(45) Date of Patent: Feb. 11, 2020

(54) CONSTRUCTIVE ARRANGEMENT OF A FLEXIBLE WHEEL FOR WHEELBARROW OR MANUALLY TRACTIONED INDUSTRIAL CARTS

(71) Applicant: Alexandre Santos Turozi, Florianópolis, SC (BR)

(72) Inventors: Alexandre Santos Turozi, Florianópolis (BR); Alexandro Oxley, Florianópolis (BR)

(73) Assignee: Alexandre Santos Turozi, Florianópolis, SC (BR)

(*) Notice: Subject to any disclaimer, the term of this patent is extended or adjusted under 35 U.S.C. 154(b) by 269 days.

(21) Appl. No.: 15/535,844

(22) PCT Filed: Nov. 10, 2015

(86) PCT No.: PCT/BR2015/050213
§ 371 (c)(1),
(2) Date: Jun. 14, 2017

(87) PCT Pub. No.: WO2016/094995
PCT Pub. Date: Jun. 23, 2016

(65) Prior Publication Data
US 2017/0334246 A1    Nov. 23, 2017

(30) Foreign Application Priority Data

Dec. 19, 2014  (BR) ................ 2020140321298

(51) Int. Cl.
*B60C 7/10* (2006.01)
*B29D 30/00* (2006.01)
(52) U.S. Cl.
CPC ............ *B60C 7/10* (2013.01); *B29D 30/0061* (2013.01); *B29D 2030/0088* (2013.01); *B60C 2007/107* (2013.01)

(58) Field of Classification Search
CPC ....... B60C 7/00; B60C 7/10; B60C 2007/107; B60B 5/02
See application file for complete search history.

(56) References Cited

U.S. PATENT DOCUMENTS 3,907,370 A * 9/1975 Bard .................. B60B 5/02
                                                  301/39.1
4,921,029 A    5/1990 Palinkas
(Continued)

FOREIGN PATENT DOCUMENTS

WO         95/04666 A1    2/1995
WO      WO-9718959 A1 *   5/1997 ............... B60C 7/08
WO       2008009042 A1    1/2008

OTHER PUBLICATIONS

International Search Report for PCT/BR2015/050213 dated Feb. 15, 2016.
Supplementary European Search Report dated Apr. 26, 2018.

*Primary Examiner* — Kip T Kotter
(74) *Attorney, Agent, or Firm* — Hedman & Costigan, P.C.; James V. Costigan; Kathleen A. Costigan

(57) ABSTRACT

A constructive arrangement of a flexible wheel for wheelbarrow or manually tractioned industrial carts is constituted by a single block that comprehends three parts: the outer ring (1), the center wall (2), and the inner ring (3); and the outer ring (1) has on its extremity a tread surface (15), and as tangents on each side it has side tread surfaces (12); and each side tread surface (12) has a plurality of radial cavities (11) spaced along the wheel; and the radial cavities (11) of a side tread surface (12) are not aligned in relation to the radial cavities (11a) of the opposite side tread surface (12a); and the center wall (2) is a flat, solid, ring-shaped wall contained in the central plane which contains the body of the wheel, and on each side of the flat wall there are a plurality of (Continued)

flexible structures (14) radially aligned to the radial cavities (11) contained in the outer ring (1).

8 Claims, 4 Drawing Sheets

(56) References Cited

U.S. PATENT DOCUMENTS

| | | | | |
|---|---|---|---|---|
| 5,139,066 | A * | 8/1992 | Jarman | B60C 7/12 |
| | | | | 152/11 |
| 8,056,593 | B2 * | 11/2011 | Palinkas | B29D 30/02 |
| | | | | 152/323 |
| 2002/0092589 | A1 * | 7/2002 | Katoh | B29D 30/02 |
| | | | | 152/157 |
| 2006/0137795 | A1 | 6/2006 | Hill | |
| 2007/0044273 | A1 | 3/2007 | Milbredt | |
| 2007/0267830 | A1 | 11/2007 | Feick | |
| 2010/0200131 | A1 * | 8/2010 | Iwase | B29D 30/00 |
| | | | | 152/209.1 |
| 2012/0234444 | A1 * | 9/2012 | Palinkas | B60C 7/18 |
| | | | | 152/246 |

* cited by examiner

CONSTRUCTIVE ARRANGEMENT OF A FLEXIBLE WHEEL FOR WHEELBARROW OR MANUALLY TRACTIONED INDUSTRIAL CARTS

The flexible wheel is a PVC-based compound, injected as a single piece, which may replace tires with inner tubes or similars in wheelbarrows and industrial carts. The flexible wheel can be applied to wheelbarrows in the construction industry and in manual forklifts in industries. Structurally it is a single block, which for description purposes is constituted of three parts: the outer ring (1), the center wall (2), and the inner ring (3). The outer ring (1) has on its extremity a tread surface (15), and as tangents on each side it has side tread surfaces (12). The center wall (2) is a flat, solid, ring-shaped wall. The inner ring (3) is constituted of the circular wall (31) of the inner ring (3), the reinforcement rim (32) of the inner ring (3), and mass reducers (33).

On the market there are available rigid wheels for wheelbarrows and manually tractioned industrial carts. These wheels are made of iron, wood, plastic, or other rigid materials. These wheels are not part of the state of the art, since they are not flexible.

It is available on the current state of the art wheels for automobile vehicles that work with flexible, solid tires with no inner tube. The principle behind them is utilizing more than one material in their composition. There are many stages to the plastic injection and vulcanization in the industrial manufacturing process. It is indispensable for its functioning the utilization of an outer vulcanized layer. The company Michelin is one of the manufacturers of this solid tire, called "Non-pneumatic tire with range enhancing reinforcement." Michelin's tubeless tires have a plastic body that permits the tires to be flexible and is a different material than the material that contacts the ground; the wheel is open on both sides.

Manually tractioned carts do not require the vulcanized layer, and they can use polymers such as flexible PVC-based compounds developed for this purpose.

The utilization of PVC instead of vulcanized rubber confers the products a sustainable character, since PVC may be recycled and utilized for other industrial purposes after its use, unlike the process which uses vulcanized rubber or expanded polyurethane. These materials, when recycled, do not have the same economical viability as PVC.

Approximately 90% of the wheelbarrows in Brazil utilize tires with inner tubes. They are used in construction environments, in which are commonly present nails and sharp objects such as rocks and wood that can easily pierce these tires. It is a common occurrence in construction sites for construction workers to be using partially or completely flat tires, due to the environmental weathering and the incidents which can damage the tire.

There are solid rubber tires and expanded polyurethane tires to attend to this need, but their cost is about half of that of the wheelbarrow, and as such it is difficult for it to be widely adopted by the industry. Since the wheelbarrow has a life expectancy of around 3 months, it is not worth it for the user to pay more for a tire, since other parts of the wheelbarrow will wear out before it and then a new cart will have to be purchased.

The flexible wheel for wheelbarrow or manually tractioned industrial carts described in this report weighs 1.5 KG and is injected as a single piece of PVC compound, ensuring its low cost, compatible with the costs for industry. It is characterized by replacing the tire with inner tube, and having many material reliefs in the body of the wheel, and having a central wall that distributes the force and weight throughout the whole piece. The flexible material of the body of the wheel is the same that contacts the ground.

The material reliefs along the body of the wheel are recesses of 5 faces that guarantee the material of the wheel to always have "memory," that is, to easily return to its original position. This principle allows the product to function well for a longer timespan.

The tread surface is formed by a curved rim, very flexible but at the same time not easily deformable. The curved rim has a plurality of radial cavities formed by 3 parallel, flexible 3 mm edges, connected at the extremities by 2 non-deforming radial edges.

The flexible wheel aims to replace the tire with inner tube; it has characteristics that cater both the end-user and the industry. The wheel never goes flat and it may be used for much longer, besides being a thermoplastic that can be completely recycled, unlike the vulcanized tire which is thermoset and unlikely to be recycled by the industry.

FIG. 1 is a perspective view of the flexible wheel and it shows the radial cavity (11), the side tread surface (12), the inner wall (13) of the outer ring (1), the flexible structures (14) contained along the center wall (2), the tread surface (15) contained along the outer ring (1), the circular wall (31) of the inner ring (3), the reinforcement rim (32) of the inner ring (3), and the mass reducers (33).

Figure 10:
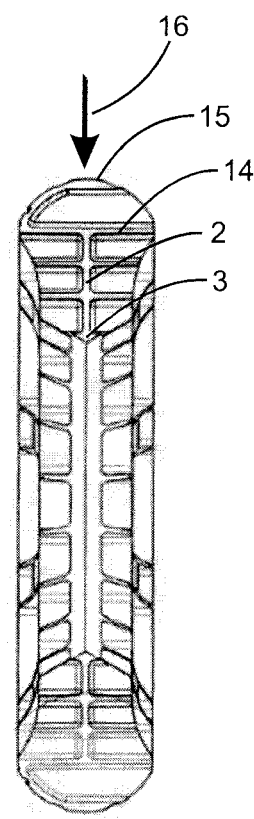

FIG. 10 shows, in a cut out, the section "H" which cuts the flexible structure (14). It shows the tread surface (15), the flexible structure (14), the center wall (2), and the inner ring (3). It also shows the arrow (16) directing radial force (16) of impact towards the tread surface (15).

The flexible wheel is characterized by being constituted of a single block which for description purposes is constituted of three parts: the outer ring (1), the center wall (2), and the inner ring (3).

Figure 1:
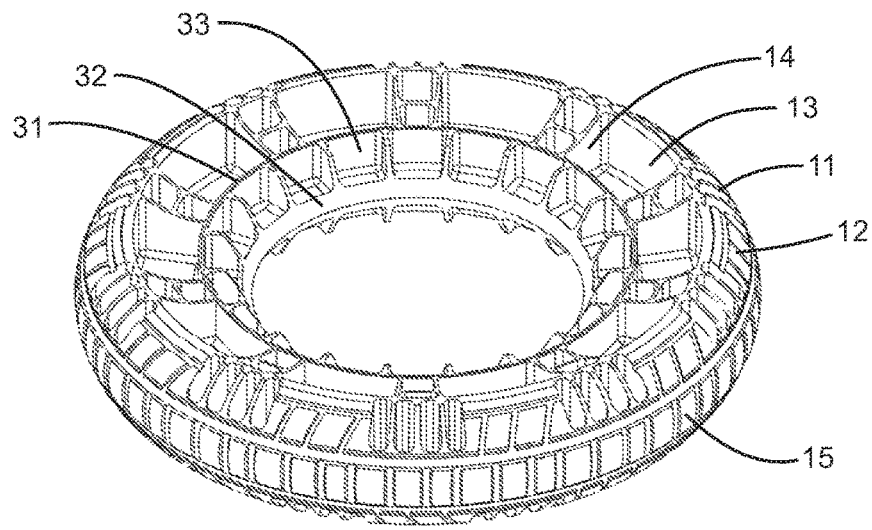
Figure 2:
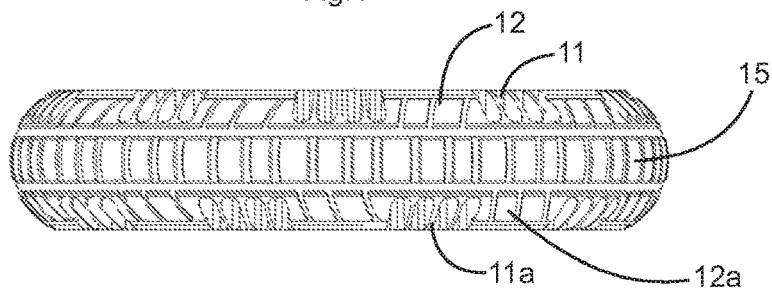
FIG. 2 shows a front view of the wheel and it displays the radial cavity (11), the side tread surface (12) and the tread surface (15) contained along the outer ring (1).
Figure 3:
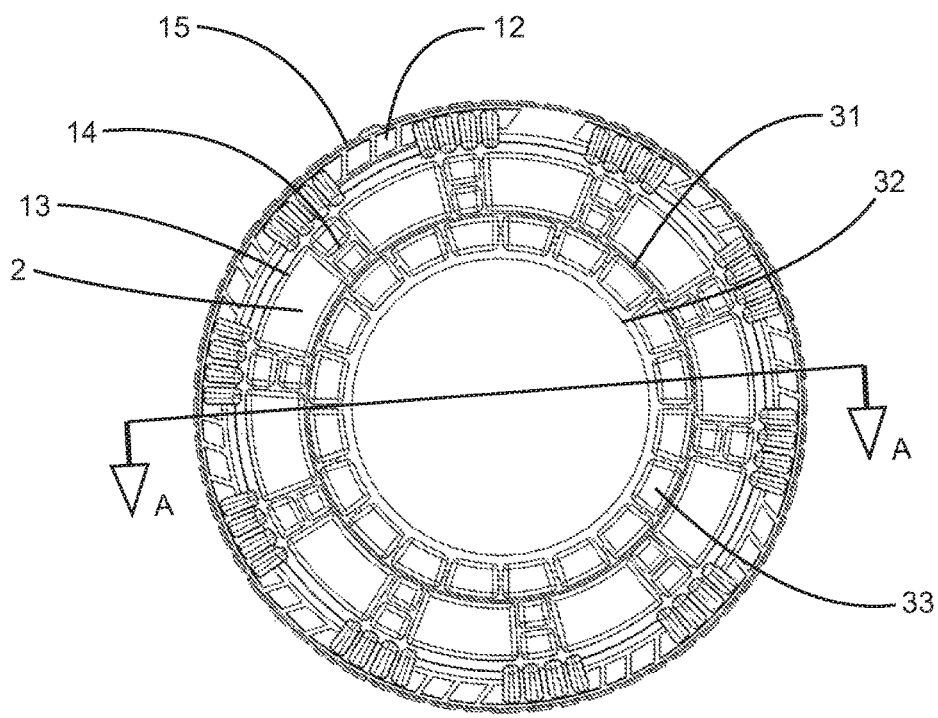
FIG. 3 is a side view of the wheel, and it shows the center wall (2), the side tread surface (12), the inner wall (13) of the outer ring (1), the tread surface (15) contained along the outer ring (1), the circular wall (31) of the inner ring (3), the reinforcement rim (32) of the inner ring (3), and the mass reducers (33). It also shows cut line AA, whose cut out is represented in FIG. 4.
Figure 4:
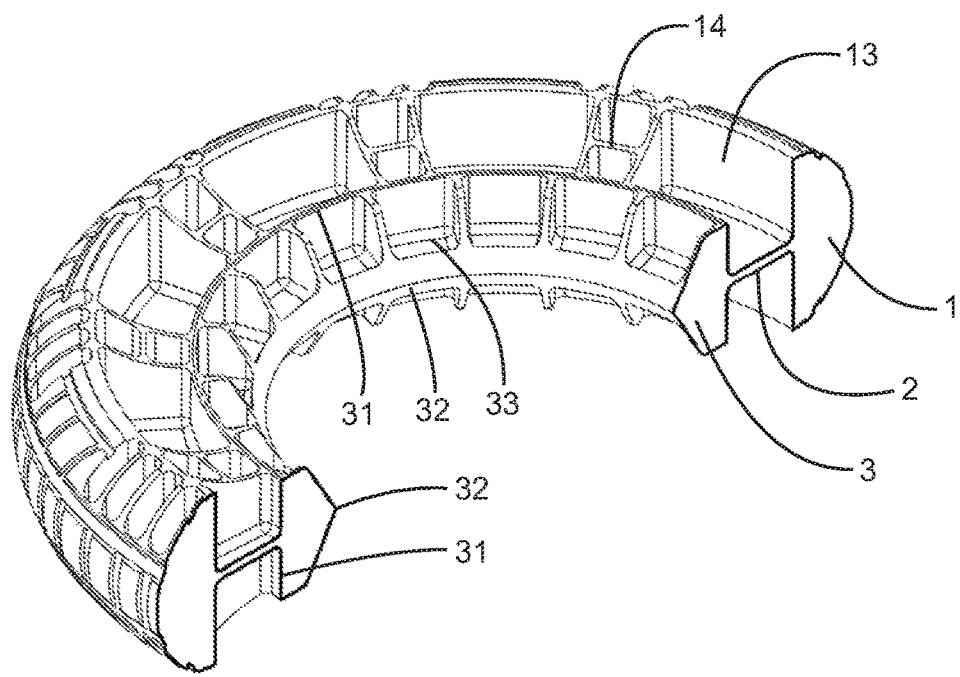
FIG. 4 is a cut out view of the wheel and it shows the outer ring (1), the center wall (2), the inner ring (3), the inner wall (13) of the outer ring (1), the flexible structures (14) contained along the center wall (2), the circular wall (31) of the inner ring (3), the reinforcement rim (32) of the inner ring (3), and mass reducers (33).
Figure 5:
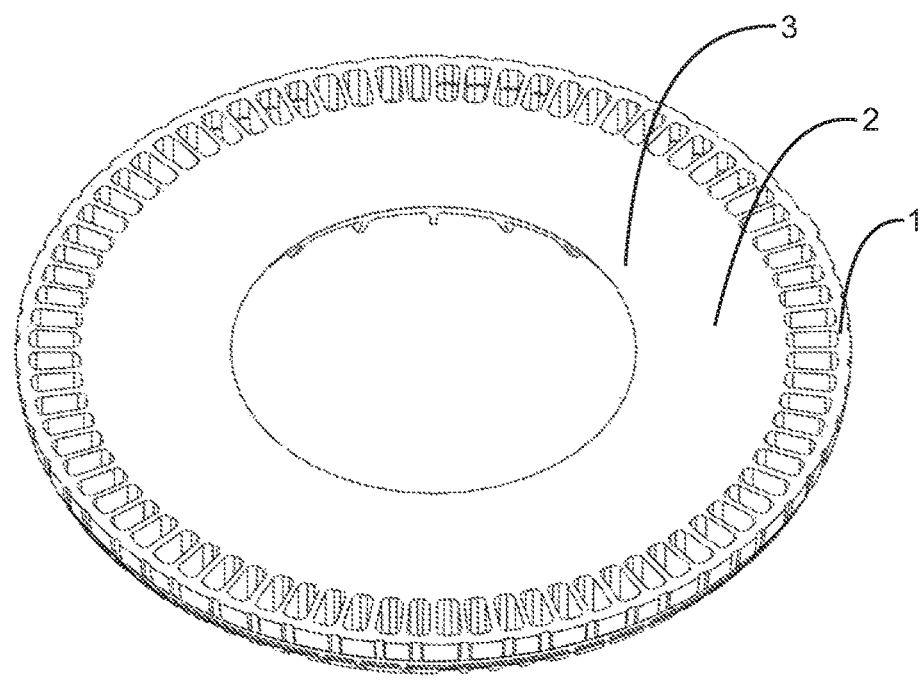
FIG. 5 shows the face of a longitudinal cut of the wheel and it shows the outer ring (1), the center wall (2), and the inner ring (3).
Figure 6:
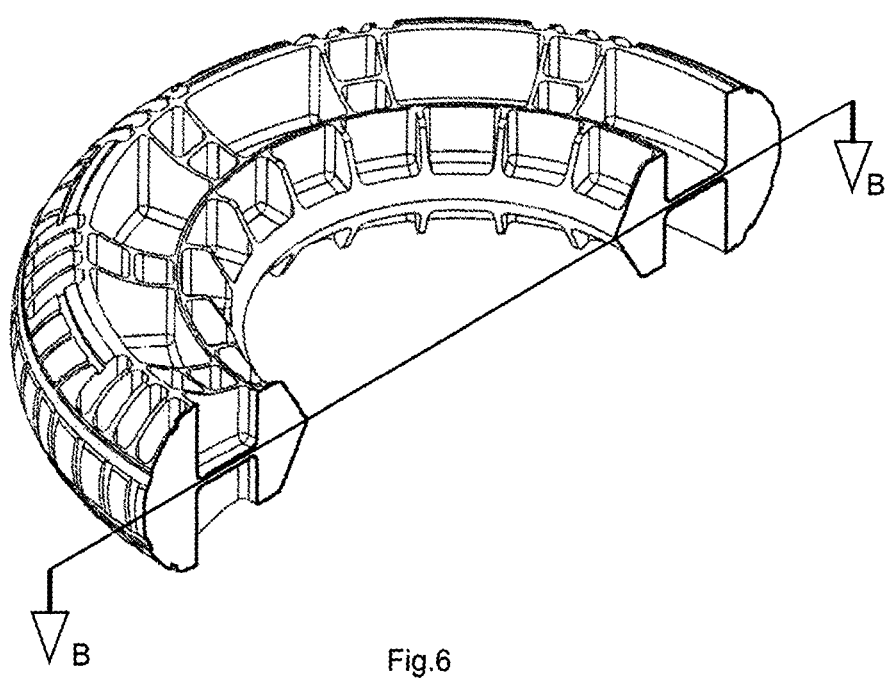
FIG. 6 shows the BB cut line, whose cut out drawing is represented in FIG. 5.
Figure 7:
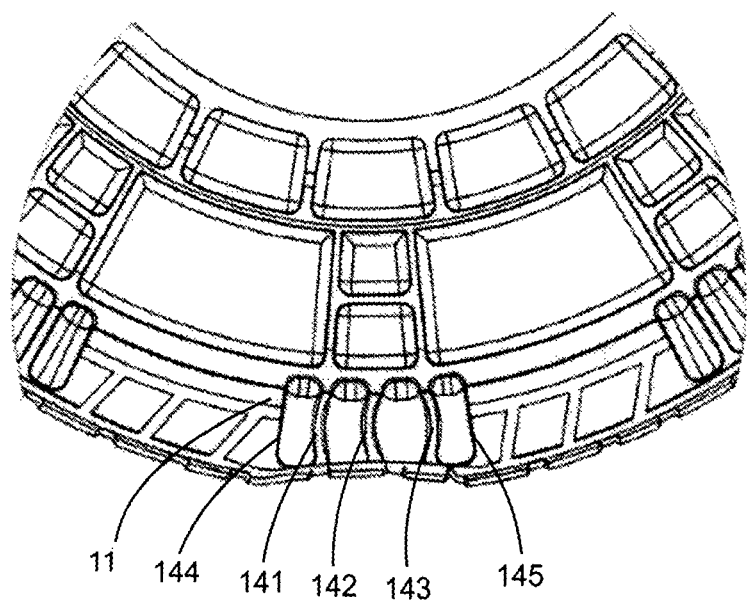
FIG. 7 is a detail of the wheel and it shows the radial cavity (11) with the inner edges (141, 142, 143) deformed by impact absorption, and it shows the outer edges (144 and 145) that remain rigid and inflexible supporting stronger impact than the internal edges (141, 142, 143).
Figure 8:
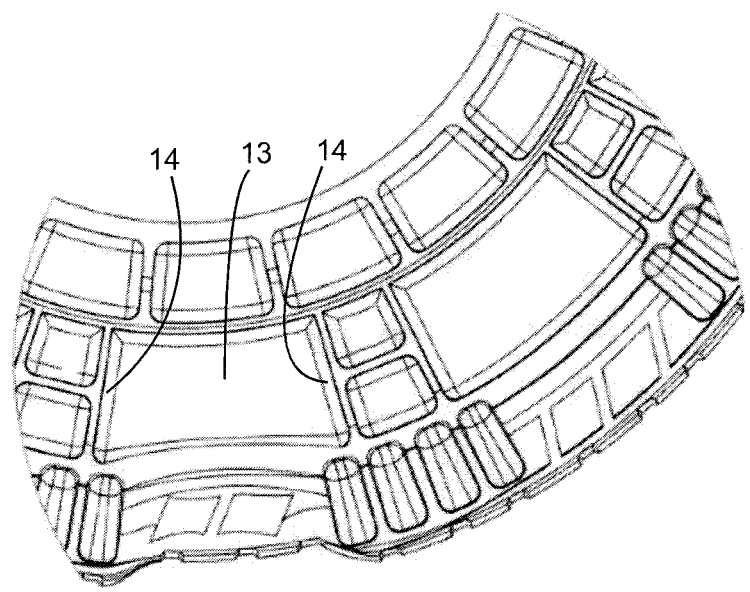
FIG. 8 is a detail of the wheel and it shows the flexible structure (14) that supports stronger impacts remaining rigid while the inner wall (13) deforms first, absorbing a less intense impact.
Figure 9:
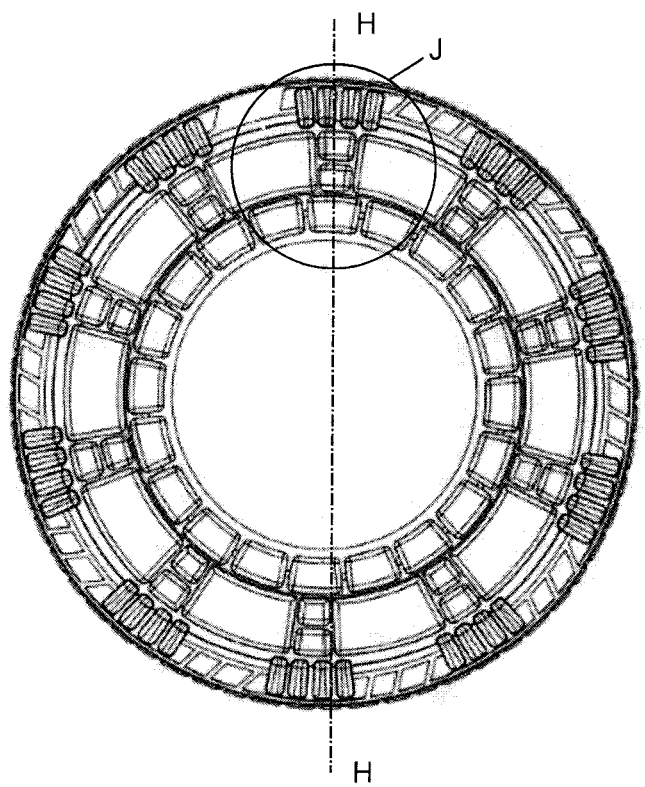
FIG. 9 is a side view of the wheel and it highlights the "J" detail and the "H" cut line.

The outer ring (1) has on its extremity a tread surface (15), and as tangents on each side it has side tread surfaces (12). Each side tread surface (12) has a plurality of radial cavities (11) spaced along the wheel. The radial cavities (11) of a side tread surface (12) are not aligned in relation to the radial cavities (11a) of the opposite side tread surface (12a), as shown in FIG. 2. This constructive arrangement provides flexibility the sides of the wheel without losing mechanical resistance to exertion on the side of the wheel.

The center wall (2) is a flat, solid, ring-shaped wall contained in the central plane which contains the body of the wheel. On each side of the flat wall there are a plurality of flexible structures (14) radially aligned to the radial cavities (11) contained in the outer ring (1). This constructive arrangement provides radial flexibility to the wheel without losing mechanical resistance to exertion on the side of the wheel. The radial impacts (16) exerted upon the wheel at the tread surface (15) are transmitted to the inner ring (3) through the center wall (2), as shown in FIG. 10.

The inner ring (3) is constituted of the circular wall (31) of the inner ring (3), the reinforcement rim (32) of the inner ring (3), and mass reducers (33). The reinforcement rim (32) is meant to be fixed to the wheel hub, bearing, and wheel axle. The mass reducers (33) are recesses within the radial walls; they are meant to reduce the quantity of material used in plastic injection manufacturing.

The invention claimed is:

1. A wheel constituted by a single block that comprises:
   (a) an outer ring (1) having a tread surface (15) that faces outwardly from said wheel, said tread surface (15) having a first side tread surface (12) and a second side tread surface (12a) arranged tangentially on each side of said tread surface (15); said first and second side tread surfaces (12,12a) have a plurality of first and second radial cavities (11,11a) are spaced around the circumference of said wheel and positioned so that said plurality of said first radial cavities (11) on said first side tread surface are not aligned opposite to said plurality of second radial cavities (11a) on said second side tread surface (12a); wherein said tread surface (15), that faces outwardly from said wheel, is formed into a curved rim and said first and second radial cavities (11a, 11b) are formed by three parallel, flexible edges (141, 142, 143), connected at extremities of said radial cavities (11a,11b) by two non-deforming, radial edges;
   (b) a center wall (2) comprising a flat, solid, ring-shaped wall in a central plane of said wheel where said central plane is parallel to said outer ring (1) of said wheel; each side of said center wall (2) having a plurality of flexible structures (14) spaced around the circumference of said wheel; and
   (c) said center wall (2) having an inner ring portion (3) comprising a circular wall (31), a reinforcement rim (32) and recesses with radial walls.

2. A wheel constituted by a single block as defined in claim 1 wherein the tread surface (15) is made of the same material that is used to make the first and second radial cavities (11a, 11b) and the flexible structure (14).

3. A wheel constituted by a single block as defined in claim 2 wherein the impact absorption of the flexible wheel for a wheelbarrow occurs in two stages, the first stage occurs in the outer ring (1) and the second stage occurs in the center wall (2).

4. A wheel constituted by a single block as defined in claim 2 wherein the wheel is made of a flexible PVC-based compound.

5. A wheel constituted by a single block as defined in claim 1 wherein the impact absorption of the flexible wheel for a wheelbarrow occurs in two stages, the first stage in the outer ring (1) and the second stage in the center wall (2).

6. A wheel constituted by a single block as defined in claim 5 wherein the wheel is made of a flexible PVC-based compound.

7. A wheel constituted by a single block as defined in claim 1 wherein the wheel is made of a flexible PVC-based compound.

8. A wheel constituted by a single block that consists of:
   (a) an outer ring (1) having a tread surface (15) that faces outwardly from said wheel, said tread surface (15) having a first side tread surface (12) and a second side tread surface (12a) arranged tangentially on each side of said tread surface (15); said first and second side tread surfaces (12,12a) have a plurality of first and second radial cavities (11,11a) are spaced around the circumference of said wheel and positioned so that said plurality of said first radial cavities (11) on said first side tread surface are not aligned opposite to said plurality of second radial cavities (11a) on said second side tread surface (12a); wherein said tread surface (15), that faces outwardly from said wheel, is formed into a curved rim and said first and second radial cavities (11a,11b) are formed by three parallel, flexible edges (141,142,143), connected at extremities of said radial cavities (11a,11b) by two non-deforming, radial edges;
   (b) a center wall (2) comprising a flat, solid, ring-shaped wall in a central plane of said wheel where said central plane is parallel to said outer ring (1) of said wheel; each side of said center wall (2) having a plurality of flexible structures (14) spaced around the circumference of said wheel; and
   (c) said center wall (2) having an inner ring portion (3) comprising a circular wall (31), a reinforcement rim (32) and recesses with radial walls.

* * * * *